United States Patent
Xu et al.

(10) Patent No.: US 10,422,922 B2
(45) Date of Patent: Sep. 24, 2019

(54) METHOD FOR PREDICTING ROCK STRENGTH BY INVERTING PETROPHYSICAL PROPERTIES

(71) Applicants: Xiaoxia Xu, Houston, TX (US); Enru Liu, Sugar Land, TX (US); Dominique Gillard, Houston, TX (US); Yaping Zhu, Katy, TX (US); Kaushik Bandyopadhyay, Houston, TX (US); Fuping Zhou, Sugar Land, TX (US)

(72) Inventors: Xiaoxia Xu, Houston, TX (US); Enru Liu, Sugar Land, TX (US); Dominique Gillard, Houston, TX (US); Yaping Zhu, Katy, TX (US); Kaushik Bandyopadhyay, Houston, TX (US); Fuping Zhou, Sugar Land, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 439 days.

(21) Appl. No.: 14/389,956

(22) PCT Filed: Apr. 15, 2013

(86) PCT No.: PCT/US2013/036620
§ 371 (c)(1),
(2) Date: Oct. 1, 2014

(87) PCT Pub. No.: WO2013/176799
PCT Pub. Date: Nov. 28, 2013

(65) Prior Publication Data
US 2015/0301223 A1    Oct. 22, 2015

Related U.S. Application Data (60) Provisional application No. 61/651,424, filed on May 24, 2012.

(51) Int. Cl.
*E21B 7/00* (2006.01)
*G01V 1/30* (2006.01)
(Continued)

(52) U.S. Cl.
CPC .............. *G01V 99/005* (2013.01); *E21B 7/00* (2013.01); *E21B 49/00* (2013.01); *G01V 1/306* (2013.01);
(Continued)

(58) Field of Classification Search
CPC ........ G01V 99/005; G01V 1/306; G01V 1/50; E21B 7/00; E21B 49/00; G06F 17/10
(Continued)

(56) References Cited

U.S. PATENT DOCUMENTS 4,817,061 A * 3/1989 Alford .................... G01V 1/284
                                                              367/75
4,969,130 A * 11/1990 Wason .................... E21B 49/00
                                                              367/37

(Continued)

FOREIGN PATENT DOCUMENTS

WO    WO 2009/008602    1/2009
WO    WO 2009/137228    11/2009
(Continued)

OTHER PUBLICATIONS

Staub, I. et al. Strategy for a Rock Mechanics Site Descriptive Model: Development and testing of the theoretical approach [online], May 2002 [retrieved on May 31, 2017]. Retrieved from the Internet: <URL: http://www.skb.com/publication/19518/R-02-02.pdf>.*
(Continued)

*Primary Examiner* — Kamini S Shah
*Assistant Examiner* — Iftekhar A Khan
(74) *Attorney, Agent, or Firm* — ExxonMobil Upstream Research Company—Law Department (57) ABSTRACT

A system and method to predict rock strength by directly inverting for petrophysical properties. In one embodiment, seismic data is received or obtained from a seismic survey (step 101). The seismic data are then conditioned (step 103)
(Continued)

in order to prepare them for an inversion process (step 105). The inversion process has an embedded rock physics model that allows the inversion to be formulated based upon, and thereby outputting or calculating (step 107), petrophysical properties. Rock strength data may then be calculated from the petrophysical properties (step 109).

11 Claims, 6 Drawing Sheets

(51) Int. Cl.
  *G01V 1/50* (2006.01)
  *E21B 49/00* (2006.01)
  *G01V 99/00* (2009.01)
  *G06F 17/10* (2006.01)
(52) U.S. Cl.
  CPC ............... *G01V 1/50* (2013.01); *G06F 17/10* (2013.01); *G01V 2210/624* (2013.01)
(58) Field of Classification Search
  USPC .......................................................... 703/2
  See application file for complete search history.

(56) References Cited

U.S. PATENT DOCUMENTS

| | | | |
|---|---|---|---|
| 5,077,697 A | 12/1991 | Chang | |
| 5,387,767 A * | 2/1995 | Aron | B06B 1/0614 367/25 |
| 5,659,135 A | 8/1997 | Cacas | |
| 5,675,147 A | 10/1997 | Ekstrom et al. | |
| 5,828,981 A | 10/1998 | Callender et al. | |
| 5,852,587 A * | 12/1998 | Kostek | G01V 1/52 367/25 |
| 5,869,755 A | 2/1999 | Ramamoorthy et al. | |
| 6,061,300 A | 5/2000 | Yamamoto | |
| 6,088,656 A | 7/2000 | Ramakrishnan et al. | |
| 6,091,669 A | 7/2000 | Chen | |
| 6,289,284 B1 | 9/2001 | Yamamoto | |
| 6,374,185 B1 | 4/2002 | Taner et al. | |
| 6,470,274 B1 | 10/2002 | Mollison et al. | |
| 6,473,696 B1 | 10/2002 | Onyia et al. | |
| 6,493,632 B1 | 12/2002 | Mollison et al. | |
| 6,529,833 B2 | 3/2003 | Fanini et al. | |
| 6,674,432 B2 | 1/2004 | Kennon et al. | |
| 6,711,502 B2 | 3/2004 | Mollison et al. | |
| 6,715,551 B2 | 4/2004 | Curtis et al. | |
| 6,718,265 B2 | 4/2004 | Herron et al. | |
| 6,751,558 B2 | 6/2004 | Huffman et al. | |
| 6,795,773 B2 | 9/2004 | Soliman et al. | |
| 6,904,365 B2 | 6/2005 | Bratton et al. | |
| 6,941,255 B2 | 9/2005 | Kennon et al. | |
| 6,959,246 B2 | 10/2005 | Herron | |
| 6,977,866 B2 | 12/2005 | Huffman et al. | |
| 6,987,385 B2 | 1/2006 | Akkurt et al. | |
| 7,006,951 B2 | 2/2006 | Pond, Jr. et al. | |
| 7,027,964 B2 | 4/2006 | Kennon | |
| 7,042,802 B2 * | 5/2006 | Sinha | G01V 1/50 367/25 |
| 7,043,413 B2 | 5/2006 | Ward et al. | |
| 7,111,681 B2 | 9/2006 | Detournay et al. | |
| 7,149,671 B2 | 12/2006 | Lim et al. | |
| 7,257,490 B2 | 8/2007 | Georgi et al. | |
| 7,260,508 B2 | 8/2007 | Lim et al. | |
| 7,277,795 B2 | 10/2007 | Boitnott | |
| 7,286,939 B2 | 10/2007 | Bachrach et al. | |
| 7,356,413 B2 | 4/2008 | Georgi et al. | |
| 7,363,161 B2 | 4/2008 | Georgi et al. | |
| 7,369,973 B2 | 5/2008 | Kennon et al. | |
| 7,373,251 B2 * | 5/2008 | Hamman | G01V 1/306 367/73 |
| 7,377,318 B2 | 5/2008 | Detournay et al. | |
| 7,472,588 B2 | 1/2009 | Slavin et al. | |
| 7,516,016 B2 | 4/2009 | DeMartini et al. | |
| 7,773,456 B2 * | 8/2010 | Hornby | G01V 1/40 367/38 |
| 8,086,426 B2 * | 12/2011 | El Ouair | G01V 1/30 703/2 |
| 9,772,413 B2 * | 9/2017 | Krohn | G01V 1/247 |
| 2002/0010570 A1 * | 1/2002 | Malthe-Sorenssen | G01V 1/282 703/10 |
| 2002/0067373 A1 | 6/2002 | Roe et al. | |
| 2005/0090986 A1 * | 4/2005 | Van Riel | G01V 1/30 702/6 |
| 2006/0015310 A1 * | 1/2006 | Husen | E21B 43/26 703/10 |
| 2006/0025976 A1 | 2/2006 | Kennon et al. | |
| 2006/0153005 A1 | 7/2006 | Herwanger et al. | |
| 2006/0219402 A1 | 10/2006 | Lecampion | |
| 2007/0005253 A1 * | 1/2007 | Fornel | E21B 43/00 702/14 |
| 2008/0033656 A1 | 2/2008 | Herwanger | |
| 2008/0120034 A1 | 5/2008 | Georgi et al. | |
| 2008/0130407 A1 | 6/2008 | Akhtar | |
| 2008/0221800 A1 | 9/2008 | Gladkikh et al. | |
| 2008/0319674 A1 | 12/2008 | Dai et al. | |
| 2008/0319675 A1 * | 12/2008 | Sayers | G01V 1/50 702/11 |
| 2009/0043554 A1 | 2/2009 | Horne et al. | |
| 2010/0312534 A1 * | 12/2010 | Xu | G01V 1/50 703/2 |
| 2010/0326669 A1 * | 12/2010 | Zhu | G01V 11/00 166/369 |
| 2011/0015907 A1 | 1/2011 | Crawford et al. | |
| 2011/0166840 A1 * | 7/2011 | Green | G01V 3/12 703/2 |
| 2011/0222370 A1 * | 9/2011 | Downton | G01V 1/282 367/73 |
| 2011/0246159 A1 * | 10/2011 | Herwanger | G01V 1/306 703/7 |
| 2011/0264421 A1 * | 10/2011 | Jing | G01V 3/38 703/2 |
| 2012/0271550 A1 * | 10/2012 | Jiang | G01V 1/282 702/16 |
| 2013/0140031 A1 * | 6/2013 | Cohen | E21B 43/26 166/308.1 |
| 2013/0238249 A1 * | 9/2013 | Xu | G01V 1/303 702/18 |
| 2013/0238304 A1 * | 9/2013 | Glinsky | G06F 17/5009 703/6 |
| 2013/0311151 A1 * | 11/2013 | Plessix | G01V 1/30 703/2 |
| 2014/0058678 A1 * | 2/2014 | Bansal | G01V 1/284 702/14 |
| 2014/0257780 A1 * | 9/2014 | Jing | G01V 99/005 703/6 |
| 2014/0262250 A1 * | 9/2014 | Bansal | G01V 1/303 166/254.2 |
| 2015/0293245 A1 * | 10/2015 | Mesdag | G01V 1/282 703/2 |

FOREIGN PATENT DOCUMENTS

| | | |
|---|---|---|
| WO | WO 2010/026198 | 3/2010 |
| WO | WO 2011/112294 | 9/2011 |

OTHER PUBLICATIONS

Bosch, M et al. (2010), "Seismic inversion for reservoir properties combining statistical rock physics and geostatistics: A review," *Geophysics* 75(5), pp. 75A165-75A176.

Carter, B.J. et al. (2012), "Simulating fully 3D hydraulic facturing," 57 pgs.

Goodway, B. et al. (2010), "Seismic Petrophysical and Isotrpic-anistropic AVO methods for Unconventional Gas Exploration," *The Leading Edge* 29(12), pp. 1500-1508.

(56) References Cited

OTHER PUBLICATIONS

Grana, D. et al. (2010), Probabilistic petrophysical-properties estimation integrating statistical rock physics with seisomic inversion, *Geophysics* 75(3), pp. O21-O37.
Gray, D. et al. (2010), "Principle stress estimation in shale plays using 3D seismic," GeoCanada—Working with the Earth, 4 pgs.
Higgins, S et al. (2008), "Ansistropic Stress Models Improve Completion Design in the Baxter Shale," SPE 115736, 2008 SPE Annual Technical Conf. and Exhibition, 10 pgs.
Keys, R.G. et a. (2002), "An approximation for the Xu-White velocity model," *Geophysics* 67(5), pp. 1406-1414.
Sayers, C.M. (2005), "Seismic anisotropy of shales," *Geophysical Prospecting* 53, pp. 667-676.
Zhu, Y. et al. (2011), "Understanding geophysical responses of shale-gas plays," *The Leading Edge*, pp. 332-448.

\* cited by examiner

METHOD FOR PREDICTING ROCK STRENGTH BY INVERTING PETROPHYSICAL PROPERTIES

CROSS-REFERENCE TO RELATED APPLICATION

This application is the National Stage of International Application No. PCT/US2013/036620, that published as WO 2013/176799, filed 15 Apr. 2013, which claims the benefit of U.S. Provisional Application No. 61/651,424, filed 24 May 2012, each of which is incorporated herein by reference, in its entirety, for all purposes.

FIELD OF INVENTION

This invention generally relates to the field of seismic prospecting and, more particularly, to a system and method to predict rock strength by directly inverting for petrophysical properties.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Rock mechanics is a longstanding subject that has received rapidly increasing attention in recent years since well stimulation, sometimes referred to as hydraulic fracturing for its practical use, has enabled the large-scale commercial development of unconventional resources, such as shale gas, tight sands and oil shale. Fracability of an unconventional play is often the most decisive parameter in determining its commerciality. To predict fracability, it is critical to map rock strength as rock strength information will lead to an accurate understanding of the stress field, and to some extent the rock failure criteria. To this end, the science of geophysics seeks to map the strength of rock strata such that the strata that are more amenable to stimulation treatment and hold high density of resources would be pursued with higher priority, and during development and production of such a play, an optimized strategy of well trajectory, landing, staging and perforating can be made. This may have significant impact on a permit application.

Using Lame's parameters ($\lambda$ and $\mu$, or more precisely density $\rho$ normalized Lame constants $\lambda\rho$ and $\mu\rho$), Goodway (2010) presented an attempt to map rock strength from seismic data guided by empirical observations that fracable gas shales in Barnett have high $\mu\rho$ and low $\lambda\rho$. His favor for Lame's parameters rather than Young's modulus and Poisson's ratio is largely founded on a geophysicist's familiarity with Lame's parameters as wave speeds are governed by them. However, a unique link exists between dynamic Lame's parameters and Young's modulus and Poisson's ratio. Approximately, Lame's constants are analogous to stiffness and Young's modulus, while Poisson's ratio is analogous to its reciprocity, compliance. These relationships help explain why engineers working in Barnett Shale maintain that a fracture-prone rock has high Young's modulus and low Poisson's ratio whereas Goodway (2010) contends that low $\lambda$ and high $\mu$ make a rock brittle. Lame's parameters, therefore, do not offer any advantage over Young's modulus and Poisson's ratio. Conversely, when it comes to cross-disciplinary integration, Young's modulus and Poisson's ratio have advantages over Lame's constants since almost all geomechanical and engineering literatures deal with the former instead of the latter. Density, Young's modulus and Poisson's ratio are three key parameters when grain-grain contact and grain-grain bond are simulated to study fractures in a rock formation.

Realistic rock buried in subsurface, particularly shales and shaly sands, often is anisotropic due to a variety of reasons such as anisotropic stress state, intrinsic anisotropy of minerals like clay and anisotropic rock fabric. Sayers (2005) presented a formulation where anisotropic Young's modulus and Poisson's ratio in transversely isotropic (TI) media can be estimated from wireline logs under the assumptions of 1) Thomsen's parameter $\delta$ is zero; and 2) $C12=C13$. While Sayers should be credited for his attempt to derive anisotropic rock strength parameters from the stiffness tensor, it is dangerous to make the forementioned assumptions.

Using wireline log data calibrated with measurements on core samples, Higgins (2008) applied Sayers (2005) theory in a real-life completion design in the Baxter Shale in Vermillion Basin in Wyoming. The authors emphasized that the predicted anisotropic stress profile from wireline logs is a better representation of in-situ condition than the isotropic stress profile, which resulted in a better completion design that accounted for containment, influences of staging and perforating. Similarly, without accounting for anisotropy, rock strength mapping from geophysical data is a rough approximation at best.

From wide-angle wide-azimuth seismic data, Gray (2010) attempted to estimate differential horizontal stress and Young's modulus in the Colorado shale gas play of Alberta. Based on a theory that less differential horizontal stress is favorable for stimulating fractures into a network and high Young's modulus makes a rock brittle, the work set out to identify areas of minimum differential horizontal stress and high Young's modulus. The inconsistency of the work, however, is that it completely ignored the anisotropic nature of the rock strength while accounting for anisotropic stress field. And as such it lacks a rigorous theoretical framework.

Thus, there is a need for improvement in this field.

SUMMARY OF THE INVENTION

The present invention provides a system and method for predicting rock strength.

One embodiment of the present disclosure is a method for inferring anisotropic rock strength properties from measured geophysical data, comprising: (a) developing an initial subsurface geologic model for M petrophysical properties that indirectly affect the geophysical data; (b) selecting a reflectivity model; (c) selecting a rock physics model that relates the M petrophysical properties to N geophysical properties that directly affect the geophysical data, wherein M<N; (d) simulating synthetic geophysical data using the initial subsurface geologic model, the rock physics model and the reflectivity model, wherein the M petrophysical properties are obtained from the geologic model and substituted into the rock physics model to compute the N geophysical properties required as input to the reflectivity model; (e) comparing the synthetic geophysical data to the measured geophysical data and quantifying a degree of misfit; (f) updating the initial subsurface geologic model to reduce the misfit; and (g) computing one or more subsurface rock strength properties from the updated subsurface geologic model.

The foregoing has broadly outlined the features of one embodiment of the present disclosure in order that the detailed description that follows may be better understood. Additional features and embodiments will also be described herein.

BRIEF DESCRIPTION OF THE DRAWINGS

The present invention and its advantages will be better understood by referring to the following detailed description and the attached drawings.

It should be noted that the figures are merely examples of several embodiments of the present invention and no limitations on the scope of the present invention are intended thereby. Further, the figures are generally not drawn to scale, but are drafted for purposes of convenience and clarity in illustrating various aspects of certain embodiments of the invention.

DESCRIPTION OF THE SELECTED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Persons skilled in the technical field will readily recognize that in practical applications of the disclosed methodology, it must be performed on a computer, typically a suitably programmed digital computer. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, "processing" or "computing", "calculating", "determining", "updating", "simulating," "producing," "developing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
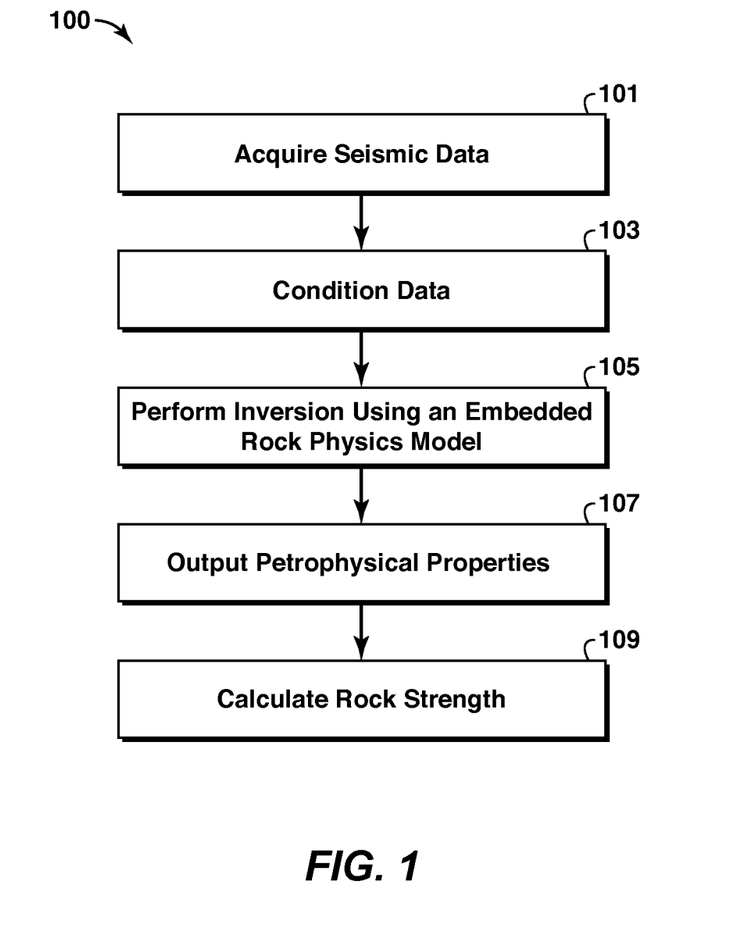
FIG. 1 is a flow chart showing the basic steps of a typical embodiment of the present disclosure.

The flow chart of FIG. 1 demonstrates the broad aspects of one embodiment of the present disclosure. As depicted, process 100 begins by acquiring or receiving seismic data from a seismic survey 101. The seismic data are then conditioned (step 103) in order to prepare them for the inversion process (step 105). The inversion process has an embedded rock physics model that allows the inversion to be formulated based upon, and thereby outputting (step 107), petrophysical properties. Rock strength data may then be calculated from the petrophysical properties (step 109).

In contrast to conventional AVO (amplitude variation with source-receiver offset) inversion for elastic properties, the rock physics model based AVO inversion technique disclosed herein directly inverts for petrophysical properties that govern the elastic properties. By embedding the rock physics model in the inversion algorithm, the inversion process becomes better constrained by reducing the number of inversion unknowns. Conventional isotropic AVO inversion typically solves for three elastic unknowns: P-wave velocity, S-wave velocity and density. Embodiments of the present disclosure reduce the number of unknowns to two petrophysical properties, such as, but not limited to, porosity and Vclay. In an anisotropic case, similar parameter reduction is possible if an anisotropic predictive rock physics model is used.

In some embodiments, all of the seismic data is conditioned in step 103. In other embodiments, only a subset of the data is conditioned. In some embodiments, the inputs to the inversion process are conditioned angle stacks. In other embodiments, the inversion algorithm accommodates prestack gathers. The present inventors have found that the inversion of angle stacks is more robust and generate acceptable results in a more timely fashion. In some embodiments, the output data volumes are first-order petrophysical properties, such as, but not limited to, porosity and Vclay.

Because the inversion is formulated in terms of common petrophysical parameters, some embodiments of the present disclosure call for the output of the inversion to be fed into known classification templates from a core/log database in order to generate a seismic lithofacies volume. In such embodiments, the above derived volumes of petrophysical properties and lithofacies can facilitate seismic stratigraphic interpretation (e.g., mapping environment of deposition) and provide a basis for data integration.

In some embodiments, the inversion process relies on a pre-migration shaping procedure for wavelet optimization. Lazaratos and David (2009), which is incorporated by reference in its entirety, teach that spectral shaping is equivalent to all other methods of acoustic inversion that are based on a one-dimensional convolutional model. More importantly, Lazaratos and David point out that it is critical to perform spectral shaping in pre-migration domain to keep the shaped wavelet consistent with dip. They further maintain that any inversion methods based on a one-dimensional convolutional model are inadequate to invert migrated traces. The Lazaratos and David workflow optimizes wavelet in a dip-consistent manner. Some embodiments of the present disclosure incorporate such a workflow to allow the inversion step to focus on deriving petrophysical properties that best fits geophysical amplitude measurements rather than waveforms.

In some embodiments of the present disclosure, the forward modeling aspect of the inversion process (step 105) consists of a plane-wave reflectivity model and a rock physics model. The plane-wave reflectivity model may comprise the Zeoppritz model or any appropriate simplified version of it as known by those skilled in the art. As understood by those skilled in the art, the reflectivity model predicts AVO from the contrast of elastic properties (i.e., P-wave velocity, S-wave velocity and density) between a calibrated background formation, such as, but not limited to, shale, and a variable formation of interest. In other words, the reflectivity model is used to solve the reflection amplitude and its variation with offset.

In order to relate petrophysical properties of a rock to its elastic properties, a variety of rock physics models may be utilized. For example, in the case of shaly sand, a shaly sand rock physics model may rely on the teachings of Keys and Xu (2002) in order to calculate the dry rock elastic properties and Gassmann fluid substitution to calculate those of saturated rocks from first-order petrophysical properties of porosity and Vclay. One caveat of such an approach is that only the sand pores are fluid substituted whereas the clay pores remain wet regardless of fluid types.

Some embodiments of the present disclosure employ a Levenberg-Marquardt Gauss-Newton algorithm in the inversion method to directly invert for the first-order petrophysical properties at each time sample of the seismic volume. The parameterization of the inversion is such that AVO reflectivity is known after data conditioning at each time sample of the seismic volume and the first-order petrophysical properties are independent variables to solve for. Because of the rock-property bounds (e.g., porosity is less than the critical porosity and 0<Vclay<1), the error topography of the objective function is well behaved.

The inversion process utilizes an initial subsurface geologic model of the petrophysical parameters. Synthetic seismic data is simulated based upon the geologic model, rock physics model and reflectivity model. The synthetic seismic data is then compared with the measured seismic data to determine the misfit. The misfit is used to update the geologic model. At each iteration of the inversion process in this example embodiment of the invention, a direction and a step size of the update is determined. As understood by those skilled in the art, the direction of the update is between that of the steepest decent and of the conjugate gradient, while the step size is proportional to the error. During initial steps (i.e., where the error is typically large), large steps are taken; however, when the geologic model is in the neighborhood of the solution, small steps are taken to quickly converge to the solution. The inventors have found that on average, it takes about five iterations before an acceptable convergence can be achieved at each time sample. For large seismic volumes, the inversion can be computationally intensive. In some practical implementations, computational speeds may be increased by utilizing parallelization techniques on GPU and multiple cores.

As previously mentioned, a pre-migration shaping procedure is utilized in some embodiments for wavelet optimization. Because the disclosed method inverts AVO for petrophysical properties, amplitude and frequency fidelity across the angle stacks should be maintained. In some embodiments, special attention is paid to the pre-migration shaping procedure to ensure amplitude fidelity and to maximize the frequency overlap of all the angle stacks (Lazaratos and Finn, 2004).

If time-misalignment is an issue across angle stacks, a mild time alignment (sometimes referred to as residual trim statics) may be applied. Regardless of time alignments, certain embodiments call for the data conditioning process (step 103) to convert the shaped seismic angle stacks into a relative reflectivity volume where every point on the seismic trace represents the reflection coefficient of that subsurface point against a calibrated constant background. The data conditioning process attempts to bring the log data, the seismic data and forward model into agreement. In situations where abundant wells are available, confidence can be achieved by this calibration process. However, in situations where no well is available, the inversion can still function, but only offers an educated guess of the earth model.

Embodiments of the present disclosure can be tailored according to the assumed subsurface model, the play type and the available geophysical data. In a conventional isotropic play, the output can be volumes of the underlying petrophysical parameters from which rock strength volumes may be derived. The petrophysical parameters may be, but are not limited to, porosity and clay percentage. The derived rock strength volumes may include, but are not limited to, static Young's modulus, Poisson's ratio and density.

Figure 2:
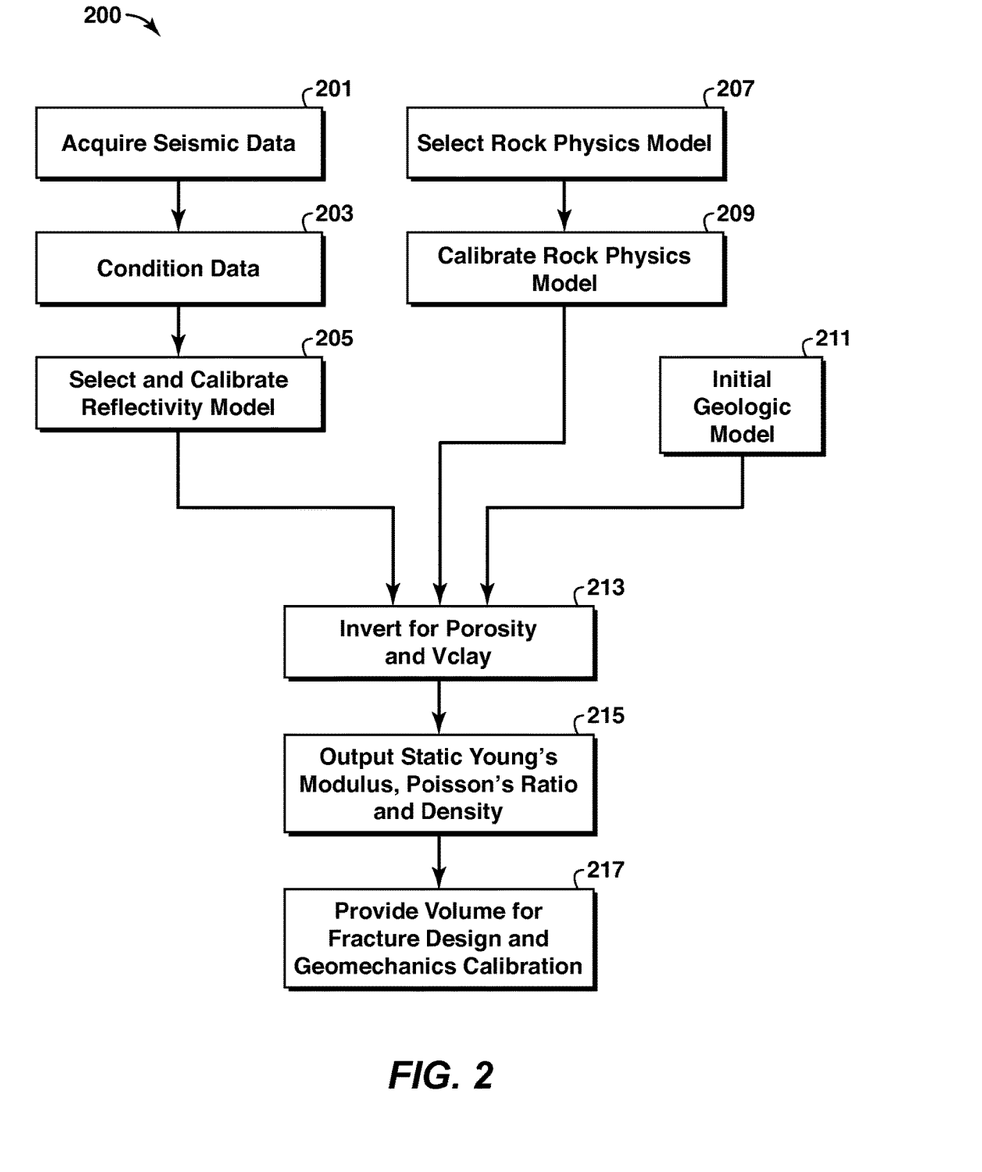
FIG. 2 is a flow chart showing one embodiment of the present disclosure for use with isotropic media.

The flow chart of FIG. 2 will be referred to in describing one embodiment of the present disclosure pertaining to an isotropic play. The depicted process (200) first acquires or receives data from a seismic survey (step 201). The pre- or post-stack seismic data is then conditioned (step 203). Conditioning the seismic data may include, but is not limited to, optimizing the wavelet effects and enhancing signal-to-noise ratio. Lazaratos 2009 describes an example of a contemplated conditioning process.

At step 205, an appropriate reflectivity model is selected and calibrated. The selection of reflectivity model may be based upon a variety of factors, such as the angle range of the input seismic data and the trend shown by the data. The reflectivity may then be calibrated using a variety of inputs. In some embodiments, the reflectivity model is calibrated using the elastic properties of the background layer right above the target. This process can be accomplished by reading the corresponding logs of the calibration wells or by building a laterally-varying background model. The reflectivity model may also be calibrated by applying a provided or determined set of global scalars and additives for all angle stacks, or their equivalent. The scalars and additives are derived by using known techniques which optimize the agreement between seismic data, well logs, and forward model prediction.

The process continues by selecting an appropriate rock physics model (step 207) and then calibrating the rock physics model (step 209). The rock physics model may be constructed using a variety of techniques, such as, but not limited to, the methodology described in U.S. Pat. No. 7,676,349 to Xu et al. In some embodiments, the rock physics model is calibrated using well logs and core measurements such that the input variables to the rock physics model (e.g., aspect ratios, moduli and density of the composing minerals) are calibrated. The rock physics model relates the petrophysical properties to elastic properties that directly affect the seismic data.

An initial subsurface geologic model 211 is then developed or obtained for the petrophysical properties that indirectly affect the seismic, or geophysical, data. At step 213, a standard non-linear Gauss-Newton inversion is run to derive the underlying petrophysical properties of the subsurface formation for every point imaged by the seismic input. In one embodiment, step 213 is performed by simulating synthetic geophysical data using the initial subsurface geologic model, the rock physics model and the reflectivity model. During the inversion process, petrophysical property values are obtained from the geologic model and substituted into the rock physics model to compute the geophysical properties required as input to the reflectivity model. The synthetic geophysical data is then compared to the measured geophysical data and quantifying a degree of misfit. The initial subsurface geologic model is then updated using known techniques to reduce the determined misfit. In some embodiments, the inversion process is iterated one or more times and the synthetic geophysical data is simulated using the updated geologic model.

At step 215, Young's modulus, Poisson's ratio and density are then calculated using the following formulae.

$$K_{dry} = K_0(1-\varphi)^p \quad \text{(Equation 1)}$$

$$\mu_{dry} = \mu_0(1-\varphi)^q \quad \text{(Equation 2)}$$

$$\rho_{dry} = \rho_0(1-\varphi) \quad \text{(Equation 3)}$$

$$E = \frac{9K_{dry}\mu_{dry}}{3K_{dry}+\mu_{dry}} \quad \text{(Equation 4)}$$

$$v = \frac{3K_{dry}-2\mu_{dry}}{6K_{dry}+2\mu_{dry}} \quad \text{(Equation 5)}$$

where $K_{dry}$, $\mu_{dry}$, and $\rho_{dry}$ are the dry-rock bulk modulus, shear modulus and density; $K_0$, $\mu_0$, and $\rho_0$ are the bulk modulus, shear modulus and density of the composing minerals; $\varphi$ the porosity of the rock; p and q are governed by the microstructure of the rock as described by Keys and Xu (2002). Assuming the rock is purely elastic, E is the static Young's modulus and v the Poisson's ratio. In cases where non-elasticity needs to be accounted for, a correction can be made to equations 4 and 5 with the aid of laboratory rock strength measurements on core samples. The calculated data volume may then be provided to an engineer for fracture design and/or geomechanics calibration (step 217). In some embodiments, the calculated rock strength data volume may be calibrated using the well log and/or core measurements. Such a calibration step may allow the rock strength data volume to capture effects not accounted for in the rock physics and/or reflectivity models.

Figure 3A:
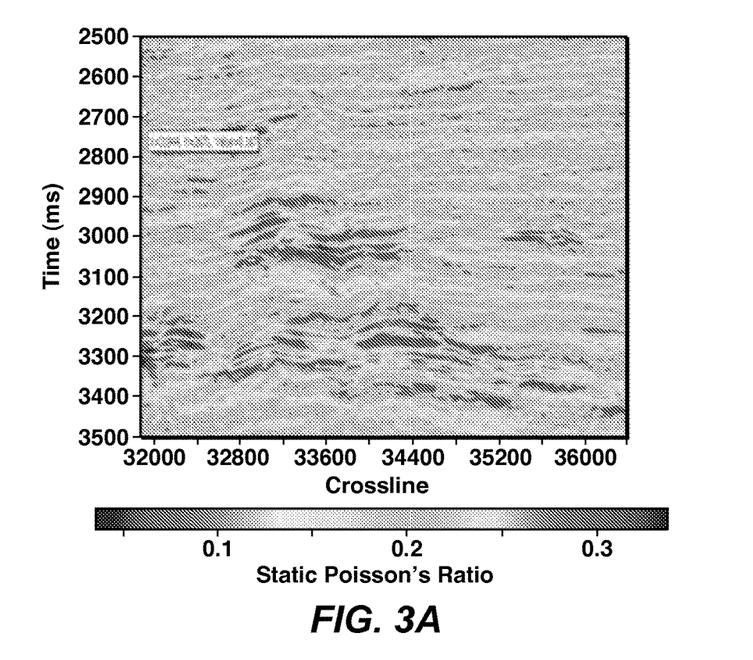
FIGS. 3A and 3B depict a cross-section of the derived rock strength in Young's modulus (FIG. 3A) and Poisson's ratio (FIG. 3B) according to one embodiment of the present disclosure.
Figure 3B:
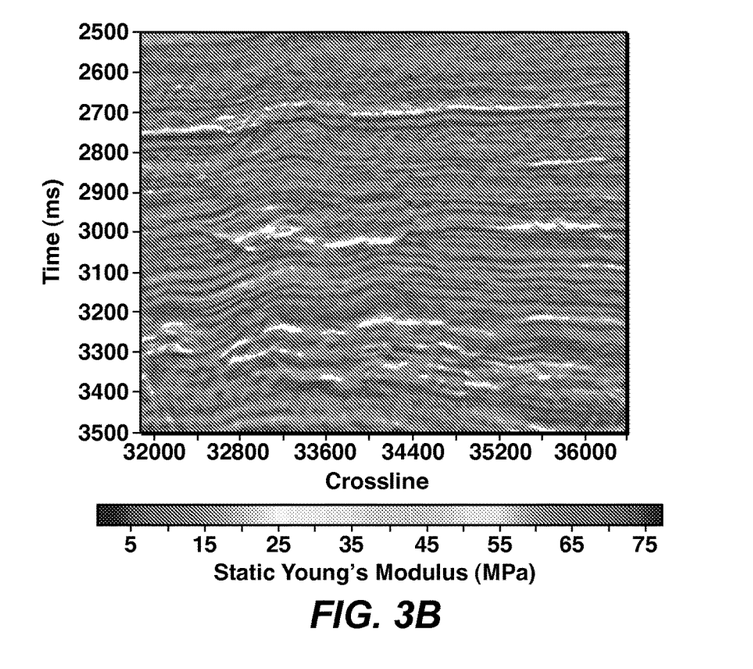

In order to aid in the understanding of the present disclosure, one embodiment was applied to a seismic field dataset. FIGS. 3A and 3B depict a cross-section of the derived rock strength in Young's modulus (FIG. 3A) and Poisson's ratio (FIG. 3B). As shown in the figure, both Poisson's ratio and Young's modulus demonstrate significant heterogeneity that needs to be accounted for in a realistic stimulation design.

Figure 4A:
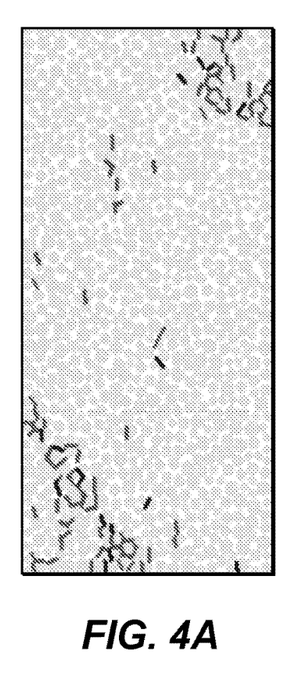
FIGS. 4A and 4B depict an exemplary fracture modeling result for a 2D rectangular sand model (FIG. 4A) and a circular sand model (FIG. 4B).
Figure 4B:
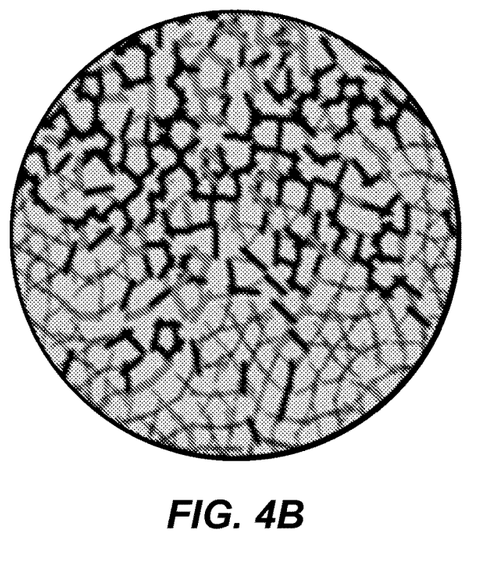

Further, an engineer's artificial fracturing design can benefit from such an input. To illustrate this aspect of the present disclosure, reference is now made to FIGS. 4A and 4B. In the current practice of fracture modeling, a one-dimensional rock strength profile is used, which results in a single set of parallel fractures. In the illustrations provided in FIGS. 4A and 4B, different fracture types (i.e., tensile and compressive) are provided with different color coding. Fracture networks are predicted from a 2D model that captures rock strength heterogeneity. FIG. 4A depicts a fracture modeling result for a 2D rectangular sand model whereas FIG. 4B provides a circular sand model. The 2D presentation shows a significant uplift in modeling different fracture types and realistic fracture network. Similar benefit can be expected from a 3D rock strength model.

In addition to obtaining a 3D volume of rock strength, some embodiments of the present disclosure also allow for the prediction of parameters that are critical to the calculation of the stress field. For example, one byproduct of embodiments of the present disclosure is a volume of density in the above-mentioned isotropic media. The integration of a density results in a vertical stress. In conjunction with the rock strength parameters, a horizontal stress can also be derived. While the derived volumes of stress field need calibration by direct measurements (such as those measurements made by downhole gauges), they provide a viable method for mapping a stress field in a 3D subsurface earth rather than only at discrete point locations.

$$\sigma_V = \int \rho_b g dz \quad \text{(Equation 6)}$$

$$\sigma_h = \sigma_H = \frac{v}{1-v}\sigma_V \quad \text{(Equation 7)}$$

Where $\sigma_V$ is the vertical stress and $\sigma_h$ and $\sigma_H$ are the minimum and maximum horizontal stresses; $\rho_b$ is the overburden formation density and v is the Poisson's ratio in eq. 5.

A similar workflow can be applied to anisotropic media. In most elastic anisotropic media, 21 independent components need to be measured in order to fully describe the stiffness tensor and the rock strength tensor. In practice, however, measuring 21 components for every point of the subsurface formation is formidable, if not impossible. Fortunately, in most cases, these 21 components are not independent of each other; rather they are controlled by the underlying micro fabric of the rock. The reference Xu et al. (2010) gives an example of how to construct an anisotropic rock physics model. One of the advantages of the principles disclosed by Xu et al. (2010) is relating the stiffness tensor to the underlying microstructure of the rock in terms of pore aspect ratios and distribution of microcracks, sand and clay pores. By rigorously linking geophysical measurements and the rock physics model, geophysical inversion can be made to derive the underlying micro fabric of the rock from which both stiffness tensor and rock strength tensor can be calculated.

In one form of anisotropic media, the azimuthal anisotropy is induced by differential horizontal stress only (i.e. transverse isotropy with a horizontal symmetry axis, also referred to as HTI media). Compared to an isotropic media where porosity and clay percentage are the underlying parameters, HTI media induced by differential horizontal stress have two additional controlling quantities: microcrack density and a standard deviation for the microcrack orientation distribution. Similar to the foregoing isotropic application, AVO in the isotropic symmetry plane can determine porosity and clay percentage. In instances where the standard deviation for the orientation distribution can be constrained, microcrack density may be derived from AVO in the symmetry axis plane of the HTI media. Hence, azimuthal AVO measurements of pure P-waves can lend to microcrack density. In cases where the standard deviation for the microcrack orientation distribution cannot be constrained, another signature in seismic data (e.g. azimuthal NMO) can be used with AzAVO to jointly invert for all the underlying petrophysical parameters, such as, but not limited to, both the orientation distribution and density of microcracks, porosity and clay percentage. In some embodiments, the elastic properties involved in the anisotropic play are a minimum of 5 stiffness parameters (such as, but not limited to, C11, C12, C33, C55, C66) and density. Other embodiments may utilization different parameterizations, such as, but not limited to, Thomsen's parameters. In some embodiments, six elastic parameters are used to fully describe an anisotropic elastic media.

Figure 5:
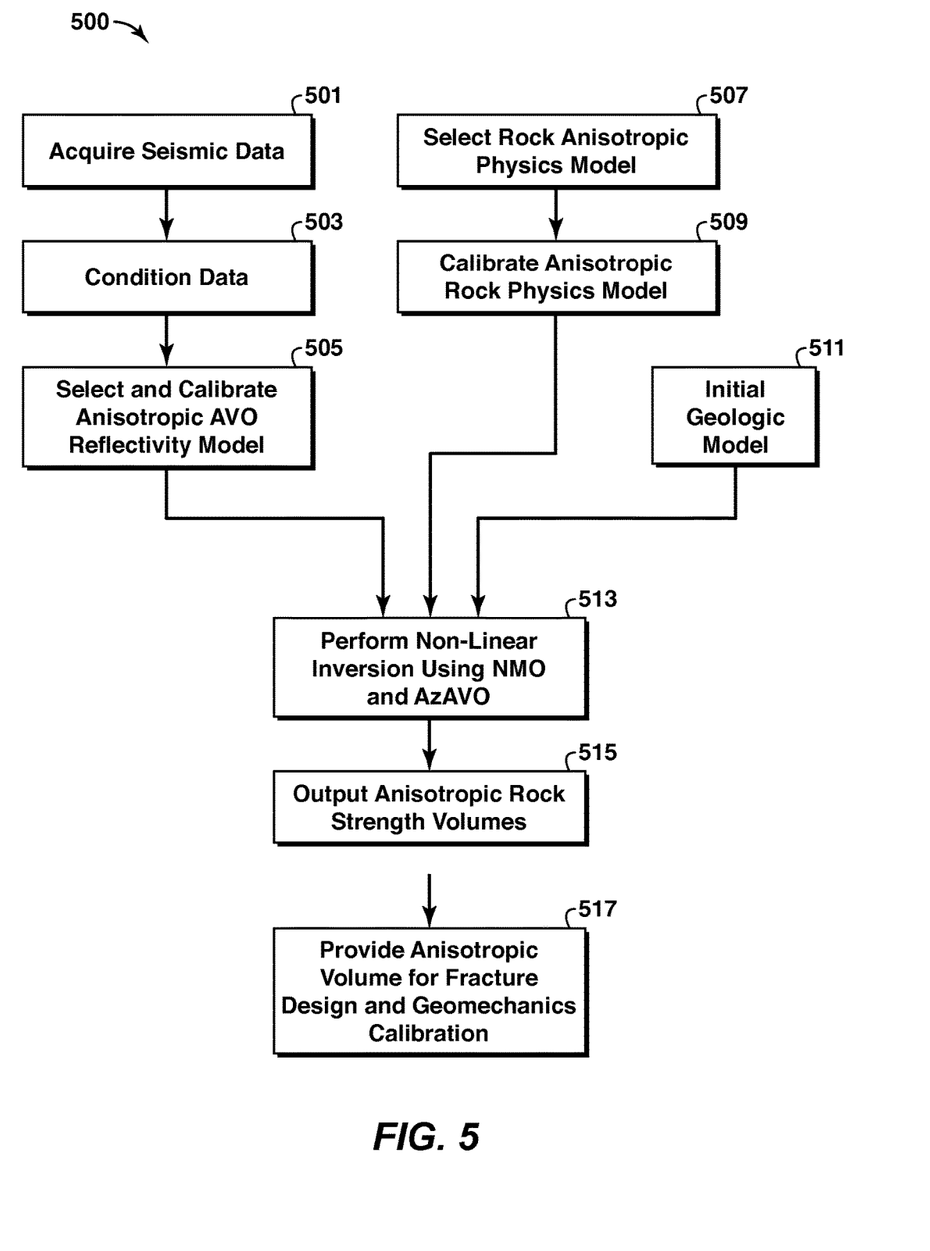
FIG. 5 is a flow chart showing one embodiment of the present disclosure for use with transversely isotropic media with a horizontal symmetry axis (HTI).

The flow chart of FIG. 5 will now be referred to in describing one embodiment of the present disclosure pertaining to an anisotropic play. The depicted process (500) first acquires or receives data from a seismic survey (step 501). The pre- or post-stack seismic data is then conditioned (step 503). Conditioning the seismic data may include, but is not limited to, optimizing the wavelet effects and the signal-to-noise ratio. At step 505, an appropriate anisotropic reflectivity model is selected and calibrated. The reflectivity model may be selected and calibrated based on the principles discussed above.

The process continues by selecting an appropriate anisotropic rock physics model (step 507) and then calibrating the rock physics model (step 509). In some embodiments, the rock physics model is calibrated using well logs and core measurements such that the input variables to the rock physics model (e.g., aspect ratios, moduli and density of the composing minerals) are calibrated.

An initial subsurface geologic model 511 is then developed or obtained for the petrophysical properties that indirectly affect the seismic, or geophysical, data. At step 513, a standard non-linear Gauss-Newton inversion is run to derive the underlying petrophysical properties of the subsurface formation for every point imaged by the seismic input. In one embodiment, step 513 is performed by simulating synthetic geophysical data using the initial subsurface geologic model, the rock physics model and the reflectivity model. During the inversion process, petrophysical property values are obtained from the geologic model and substituted into the rock physics model to compute the geophysical properties required as input to the reflectivity model. The synthetic geophysical data is then compared to the measured geophysical data and quantifying a degree of misfit. The initial subsurface geologic model is then updated using known techniques to reduce the determined misfit. In some embodiments, the inversion process is iterated one or more times and the synthetic geophysical data is simulated using the updated geologic model.

The petrophysical properties may comprise, but are not limited to, microcrack density, microcrack orientation distribution, porosity and clay percentage. In cases where one of the two microcrack quantities can be constrained, AzAVO of P-waves alone can give rise to the underlying petrophysical properties. However, when neither of the microcrack quantities can be constrained, an additional seismic signature (such as, but not limited to, azimuthal NMO) can be used with AzAVO to jointly invert for those quantities. The utilization of NMO and AzAVO is depicted in FIG. 5.

At step 515, anisotropic rock strength volumes comprising, but not limited to, anisotropic Young's modulus, anisotropic Poisson's ratio and density can be calculated using the derived underlying petrophysical properties and the rock physics model. The calculated rock strength data volume may then be provided to an engineer for fracture design and/or geomechanics calibration (step 517). In some embodiments, the calculated rock strength data volume may be calibrated using the well log and/or core measurements. Such a calibration step may allow the rock strength data volume to capture effects not accounted for in the rock physics and/or reflectivity models.

Some of the embodiments discussed above assume that the properties of the rock-composing minerals are known and the microstructure of the rock can be described by porosity and elliptical pores of different aspect ratio. In unconventional resources, such as, but not limited to, shale gas and oil shale, total organic content (TOC) and kerogen are critical components of the rock. In order to infer TOC and Kerogen variation in the subsurface formation using the same geophysical measurements, correlation between parameters of the first-order and the second-order can be used to reduce the number of variables to invert for. In some cases, for example, porosity is a function of TOC. In some embodiments, TOC can be therefore set as a first-order variable to solve for and porosity can be a derivative variable from TOC. Another embodiment of the present disclosure uses the observed correlation between porosity and clay percentage in shaly sandstone and sandy shales.

Figure 6:
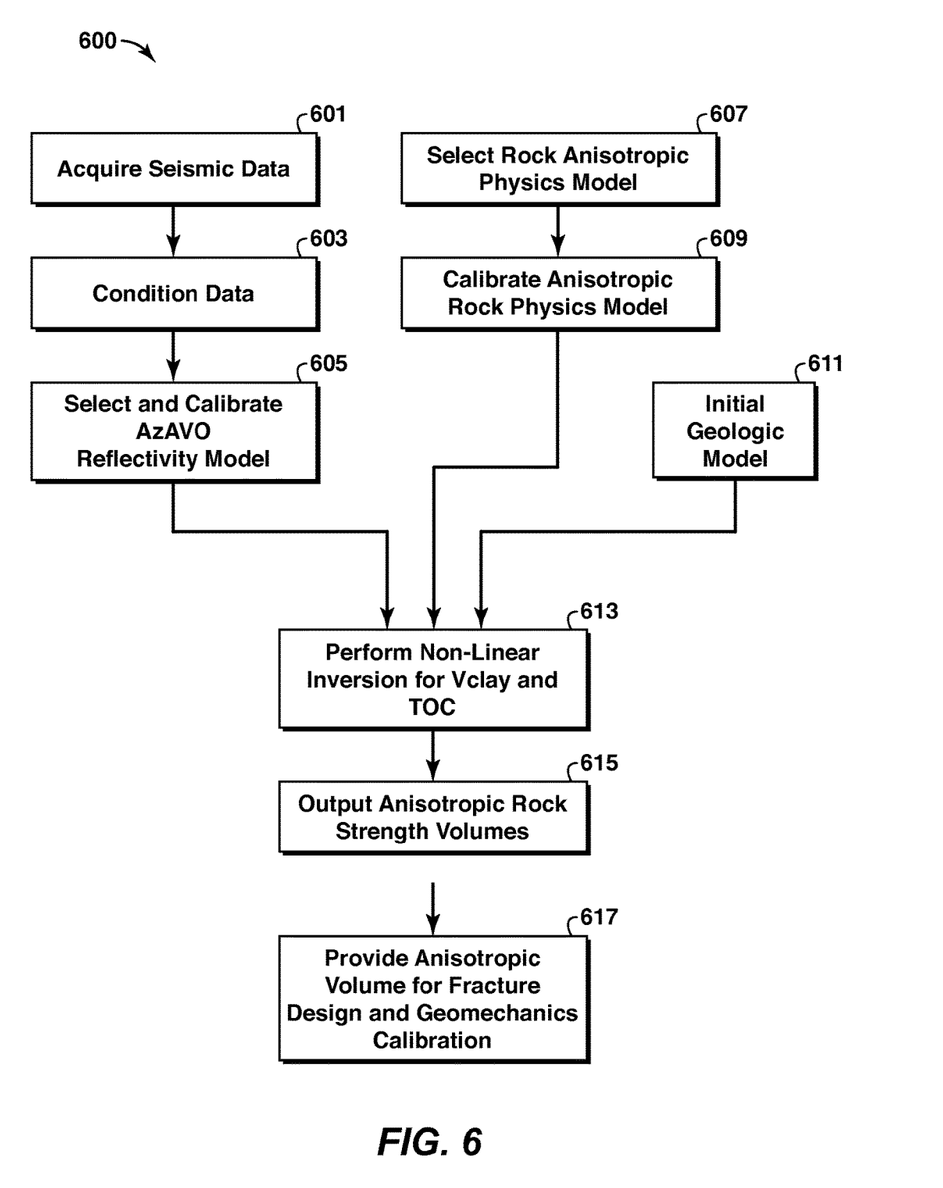
FIG. 6 is a flow chart showing one embodiment of the present disclosure for use with unconventional plays of shale gas and oil shale.

The flow chart of FIG. 6 will now be referred to in describing one embodiment of the present disclosure pertaining to an unconventional play. The depicted process (600) first acquires or receives data from a seismic survey (step 601). The pre- or post-stack seismic data is then conditioned (step 603). Conditioning the seismic data may include, but is not limited to, optimizing the wavelet effects and the signal-to-noise ratio. At step 605, an appropriate anisotropic AVO reflectivity model is selected and calibrated. The reflectivity model may be selected and calibrated based on the principles discussed above.

The process continues by selecting an appropriate anisotropic rock physics model (step 607) and then calibrating the rock physics model (step 609). In the depicted embodiment, the anisotropic rock physics model accounts for TOC and Kerogen, such as, but not limited to, a TOC rock physics model for organic-rich source rock developed by Zhu et al. 2011 (including shale gas or its analogous oil shale). In some embodiments, the rock physics model is calibrated using well logs and core measurements such that the input variables to the rock physics model (e.g., aspect ratios, moduli and density of the composing minerals) are calibrated.

An initial subsurface geologic model 611 is then developed or obtained for the petrophysical properties that indirectly affect the seismic, or geophysical, data. At step 613, a non-linear Gauss-Newton inversion is run to derive the underlying first-order petrophysical properties. In one embodiment, step 613 is performed by simulating synthetic geophysical data using the initial subsurface geologic model, the rock physics model and the reflectivity model. During the inversion process, petrophysical property values are obtained from the geologic model and substituted into the rock physics model to compute the geophysical properties required as input to the reflectivity model. The synthetic geophysical data is then compared to the measured geophysical data and quantifying a degree of misfit. The initial subsurface geologic model is then updated using known techniques to reduce the determined misfit. In some embodiments, the inversion process is iterated one or more times and the synthetic geophysical data is simulated using the updated geologic model.

The first-order petrophysical properties may comprise, but are not limited to, clay percentage, orientation distribution of clay pores, and TOC or kerogen. In some embodiments, the relationship between the second-order petrophysical properties and the first-order can be used to limit the number of independent variables to invert for. For example, the known correlation between porosity and clay percentage in shaly sandstone and sandy shales can be used so that porosity is no longer a free parameter in the inversion.

At step 615, anisotropic rock strength volumes comprising, but not limited to, anisotropic Young's modulus, anisotropic Poisson's ratio and density can be calculated using the derived underlying petrophysical properties and the rock physics model. The calculated rock strength data volume may then be provided to an engineer for fracture design and/or geomechanics calibration (step 617). In some embodiments, the calculated rock strength data volume may be calibrated using the well log and/or core measurements. Such a calibration step may allow the rock strength data volume to capture effects not accounted for in the rock physics and/or reflectivity models.

As discussed herein, some embodiments of the present disclosure provide a rock-physics model-based AVO inversion that embeds a quantitative rock physics model in the AVO inversion process. This rigorous combination entails non-linear inversion, rather than linear inversion whereby linear simplification of the AVO reflectivity or a linear rock physics relationship is used. Non-linear inversion on synthetics generated from a convolutional model is notoriously expensive, particularly when the time window of interest is more than a couple hundred milliseconds. To improve efficiency without sacrificing accuracy, some embodiments of the rock-physics model-based AVO inversion take advantage of DSR (Demigration Shaping Remigration) for wavelet optimization. After DSR and simple conditioning, every point of the angle stacks becomes the reflectivity of that point against a constant background. Thus, the rock-physics model-based AVO inversion can focus on solving for the geological properties of interest that control the elastic properties. This approach has proven to be effective in deep-water clastic environment.

It is important to note that the steps depicted in FIGS. 1, 2, 5 and 6 are provided for illustrative purposes only and a particular step may not be required to perform the inventive methodology. The claims, and only the claims, define the inventive system and methodology.

With respect to the reflectivity model and rock physics model, the word "model" is used to refer to the set of relationships or equations governing the relevant parameters or variables. The geologic model, however, refers to a three-dimensional array of numbers, i.e. geologic parameter values.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming Additionally, the present invention is in no way limited to implementation in any specific operating system or environment.

Disclosed aspects may be used in hydrocarbon management activities. As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management. In one embodiment, the disclosed methodologies and techniques may be used to extract hydrocarbons from a subsurface region. In such an embodiment, at least one rock strength property is predicted from a geologic model of the subsurface region, where the geologic model has been improved using the methods and aspects disclosed herein. Based at least in part on the at least one rock strength property, the presence and/or location of hydrocarbons in the subsurface region is predicted. Hydrocarbon extraction may then be conducted to remove hydrocarbons from the subsurface region, which may be accomplished by drilling a well using oil drilling equipment. The equipment and techniques used to drill a well and/or extract the hydrocarbons are well known by those skilled in the relevant art. Other hydrocarbon extraction activities and, more generally, other hydrocarbon management activities, may be performed according to known principles.

The following lettered paragraphs represent non-exclusive ways of describing embodiments of the present disclosure.

A. A method for inferring anisotropic rock strength properties from measured geophysical data, comprising: (a) developing an initial subsurface geologic model for M petrophysical properties that indirectly affect the geophysical data; (b) selecting a reflectivity model; (c) selecting a rock physics model that relates the M petrophysical properties to N geophysical properties that directly affect the geophysical data, wherein M<N; (d) simulating synthetic geophysical data using the initial subsurface geologic model, the rock physics model and the reflectivity model, wherein the M petrophysical properties are obtained from the geologic model and substituted into the rock physics model to compute the N geophysical properties required as input to the reflectivity model; (e) comparing the synthetic geophysical data to the measured geophysical data and quantifying a degree of misfit; (f) updating the initial subsurface geologic model to reduce the misfit; and (g) computing one or more subsurface rock strength properties from the updated subsurface geologic model.

B. The method of paragraph A, further comprising repeating (d)-(f) for one or more iterations before performing (g), wherein the updated model from (f) is used to repeat (d).

C. The method of any preceding paragraph, wherein the geological properties are selected from a group consisting of microcrack density, microcrack orientation distribution, porosity and clay percentage.

D. The method of any preceding paragraph, wherein the geophysical properties are selected from a group consisting of P-wave velocity, S-wave velocity and density.

E. The method of any preceding paragraph, wherein the rock strength properties are selected from a group consisting of Young's modulus, Poisson's ratio and density.

F. The method of any preceding paragraph, wherein the nonlinear iterative optimization technique utilizes a Gauss-Newton algorithm.

G. The method of any preceding paragraph further comprising conditioning at least a portion of the measured geophysical data before performing step (d).

H. The method of any preceding paragraph, wherein the rock physics model treats at least HTI anisotropy.

I. The method of any preceding paragraph, wherein the rock physics model and the reflectivity model are non-linear.

J. The method of any preceding paragraph further comprising acquiring well log and/or core measurement data and calibrating at least one of the subsurface rock strength properties using the well log and/or core measurement data.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

REFERENCES

Carter, B. J., et al, Simulating fully 3D hydraulic fracturing, in press 2012.
Crawford, et al., Petrophysical method for predicting plastic mechanical properties in rock formations, Pub. No: US 2011/0015907.
Goodway, B., et al., Seismic Petrophysical and Isotropic-anistropic AVO Methods for Unconventional Gas Exploration, *The Leading Edge*, 29, No. 12 (2010).
Gray, et al., Principle stress estimation in shale plays using 3D seismic, GeoCanada—working with the Earth (2010).
Higgins, et al, Anisotropic stress models improve completion design in the Baxter shale, SPE 115736 (2008).
Keys R. G. and Xu S., An approximation for the Xu-White velocity model, Geophysics V. 67 No. 5, pp. 1406-1414 (2002).
Lazaratos, S. and David, R., Spectral Shaping Inversion and Migration of Seismic data, WO2009/088602.
Sayers, C. M., Seismic anisotropy of shales, *Geophysical Prospecting,* 53:667-676 (2005).
Xu, S. Saltzer, R. and Keys, R., Integrated Anisotropic Rock Physics Model, U.S. Pat. No. 7,676,349 B2 (Mar. 9, 2010).
Zhu, Y. et al, entitled "Predicting Anisotropic Source Rock Properties from Well Data," WO2011/112294.

What is claimed is:

1. A method comprising:
    (a) developing an initial subsurface geologic model for M petrophysical properties that indirectly affect the geophysical data, wherein M is at least one;
    (b) selecting a reflectivity model;
    (c) selecting a rock physics model that relates the M petrophysical properties to N geophysical properties that directly affect the geophysical data, wherein M<N;
    (d) simulating, with a computer, synthetic geophysical data using the initial subsurface geologic model, the rock physics model and the reflectivity model, wherein the M petrophysical properties are obtained from the initial subsurface geologic model and substituted into the rock physics model to compute the N geophysical properties required as input to the reflectivity model;
    (e) comparing, with a computer, the synthetic geophysical data to the measured geophysical data and quantifying a degree of misfit;
    (f) updating, with a computer, the initial subsurface geologic model to reduce the misfit;
    (g) computing, with a computer, one or more subsurface rock strength properties, which includes at least static Young's modulus, from the updated subsurface geologic model;
    (h) generating, with a computer, a subsurface image that includes fracture networks, from the one or more subsurface rock strength properties from the updated subsurface geologic model; and
    (i) predicting fracability based on the subsurface image that includes fracture networks; and
    (j) stimulating fractures in earth's subsurface based on the predicted fracability and the subsurface image that includes fracture networks.

2. The method of claim 1, further comprising repeating (d)-(f) for one or more iterations before performing (g), wherein the updated model from (f) is used to repeat (d).

3. The method of claim 1, wherein the petrophysical properties include one or more of microcrack density, microcrack orientation distribution, porosity or clay percentage.

4. The method of claim 1, wherein the geophysical properties include P-wave velocity, S-wave velocity and density.

5. The method of claim 1, wherein the rock strength properties additionally include Poisson's ratio and density.

6. The method of claim 1 further comprising conditioning at least a portion of the measured geophysical data before performing step (d).

7. The method of claim 1, wherein the rock physics model treats at least HTI anisotropy.

8. The method of claim 1, wherein the rock physics model and the reflectivity model are non-linear.

9. The method of claim 1 further comprising acquiring well log and/or core measurement data and calibrating at least one of the subsurface rock strength properties using the well log and/or core measurement data.

10. The method of claim 1, further comprising:
drilling a well into the subsurface formation based at least in part on the at least one subsurface rock strength properties; and
producing hydrocarbons from the well.

11. The method of claim 1, wherein the rock physics model is an anisotropic rock physics model that treats at least HTI anisotropy.

\* \* \* \* \*